United States Patent [19]

Mizutani et al.

[11] 4,223,981
[45] Sep. 23, 1980

[54] TELEPHOTO ZOOM LENS

[75] Inventors: Norio Mizutani, Kawasaki; Yoshinari Hamanishi, Tokyo, both of Japan

[73] Assignee: Nippon Kogaku K.K., Tokyo, Japan

[21] Appl. No.: 898,879

[22] Filed: Apr. 21, 1978

[30] Foreign Application Priority Data

Apr. 22, 1977 [JP] Japan ................................. 52-46635

[51] Int. Cl.$^2$ .............................................. G02B 15/18
[52] U.S. Cl. ..................................................... 350/184
[58] Field of Search .............................. 350/184, 186

[56] References Cited

U.S. PATENT DOCUMENTS

| | | | |
|---|---|---|---|
| 2,937,572 | 5/1960 | Yamaji | 350/184 |
| 3,615,125 | 10/1971 | Higuchi | 350/184 |
| 4,094,586 | 6/1978 | Sato | 350/184 |

*Primary Examiner*—Conrad J. Clark
*Attorney, Agent, or Firm*—Shapiro and Shapiro

[57] ABSTRACT

A telephoto zoom lens comprises a variable power system and a relay lens system. The variable power system comprises a first group provided with a positive refracting power and capable of focusing by displacement along the optical axis, a second group provided with a negative refracting power and capable of continuously varying focal length by displacement along the optical axis and a third group provided with a positive refracting power and capable of maintaining the focal position constant regardless of the change in the focal length by displacement along the optical axis in cooperation with said second group, said system substantially constituting an afocal system to an infinite object. The relay system includes, in the order from the object side, a front group comprising a positive lens component and a negative lens component which are separated, and a rear group comprising a negative meniscus lens component convex to the image side and a positive lens component which are separated, the rear group being separated from the front group by a large air space.

19 Claims, 24 Drawing Figures

FIG. 7A  FIG. 7B  FIG. 7C
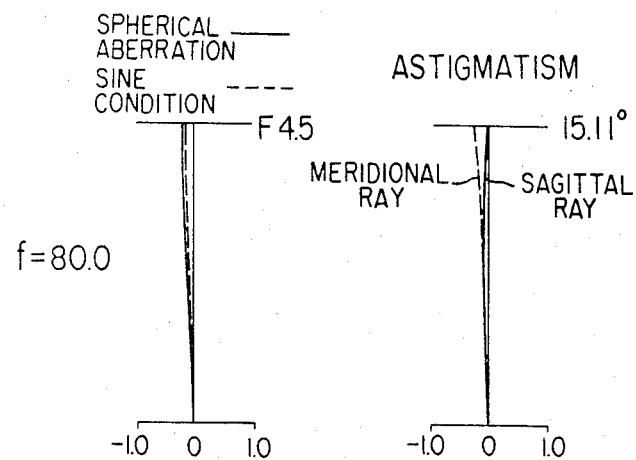
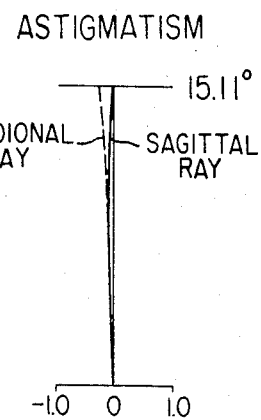
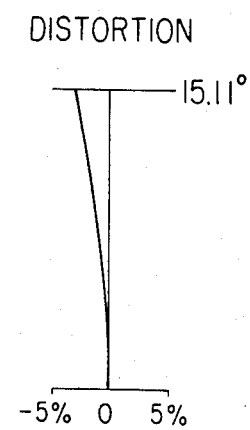
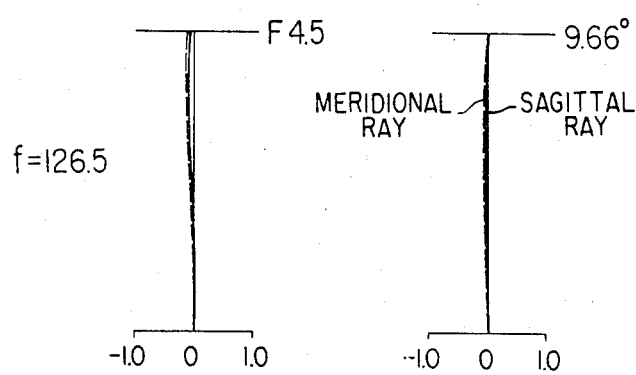
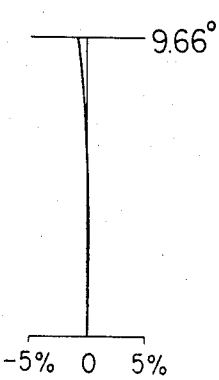
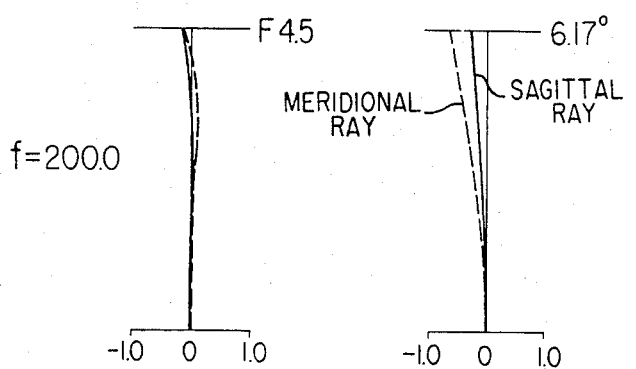
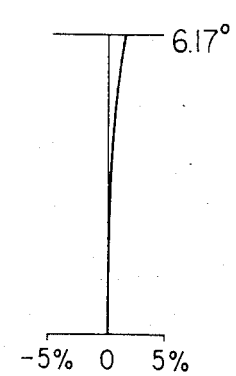

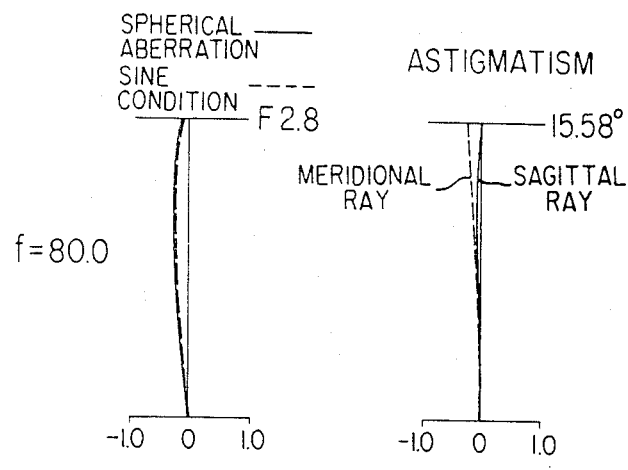
FIG. 8A  FIG. 8B  FIG. 8C
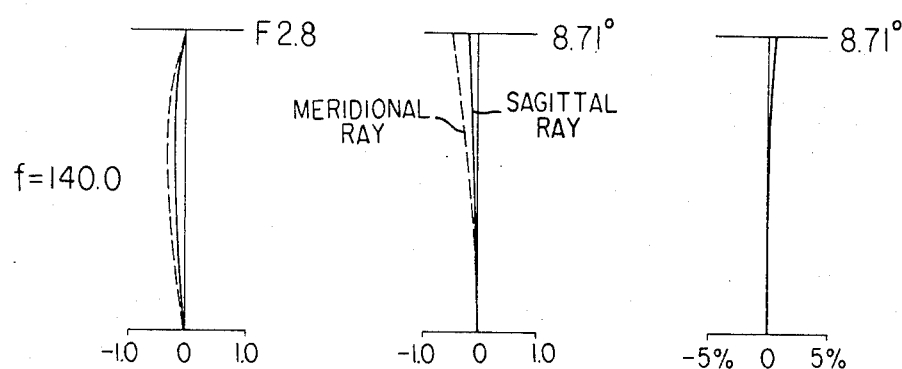
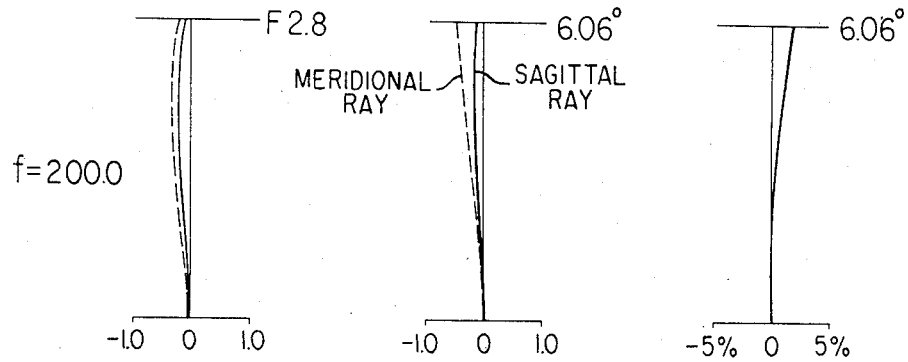

FIG. 9A  FIG. 9B  FIG. 9C
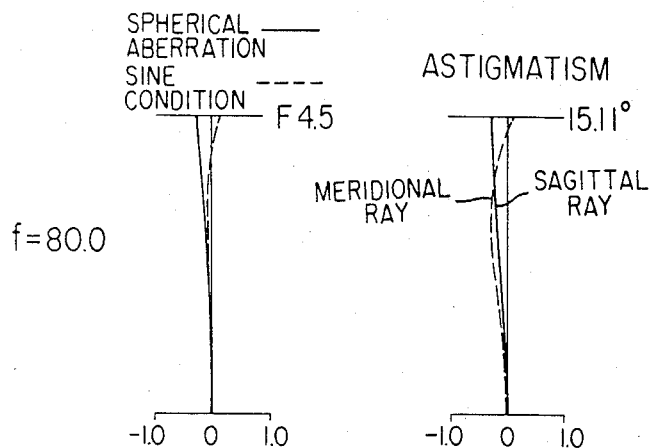
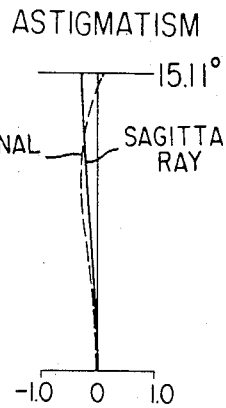
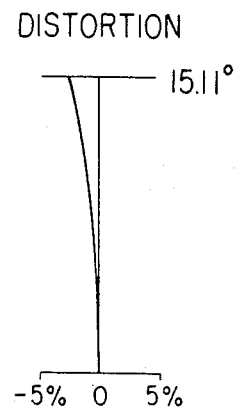
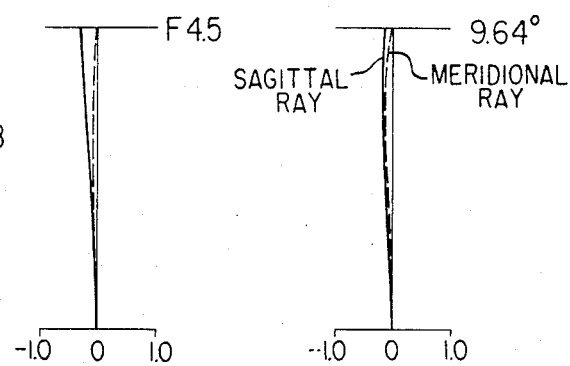
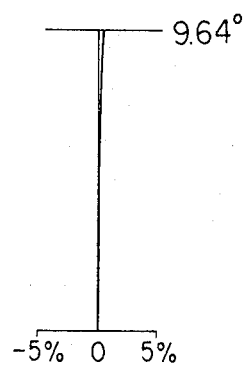
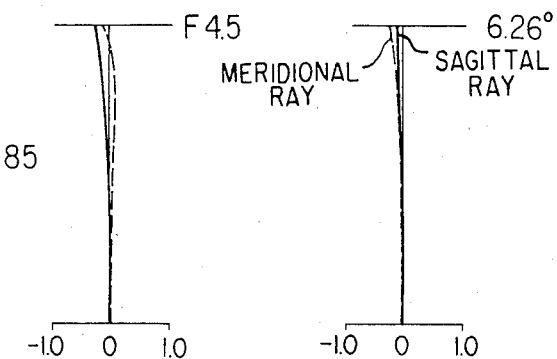
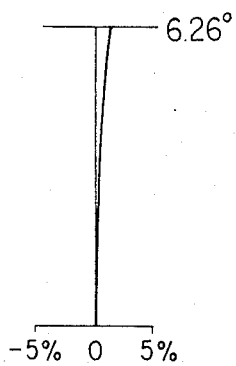

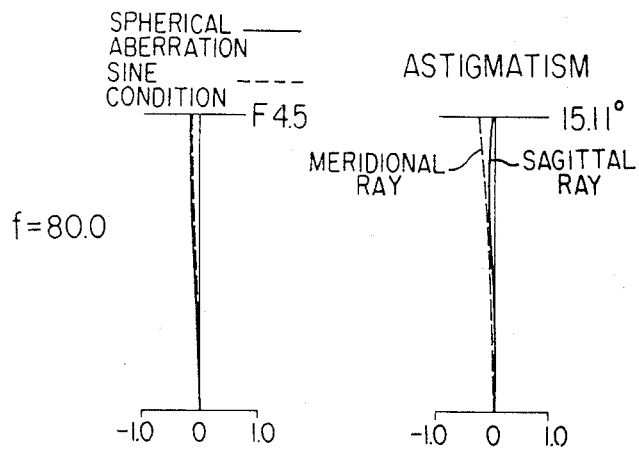
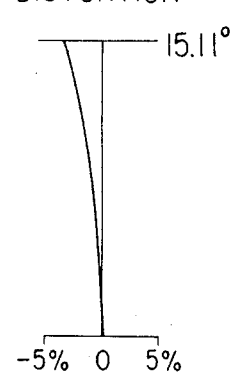
FIG. 10A — SPHERICAL ABERRATION / SINE CONDITION
FIG. 10B — ASTIGMATISM
FIG. 10C — DISTORTION
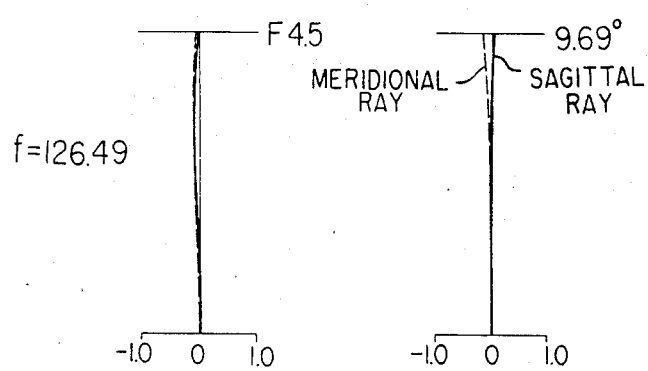
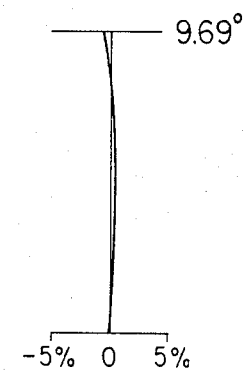
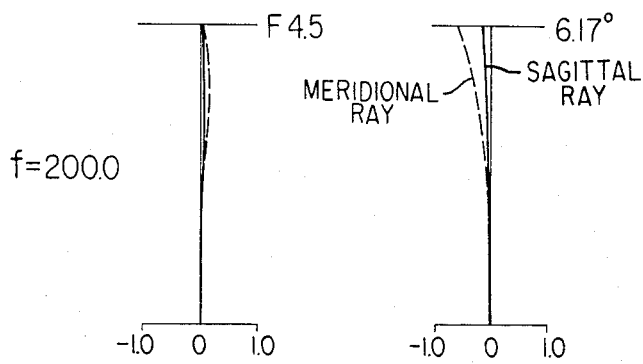
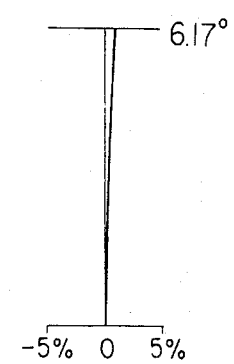

FIG. 11A
SPHERICAL ABERRATION ———
SINE CONDITION ----
f=80.0
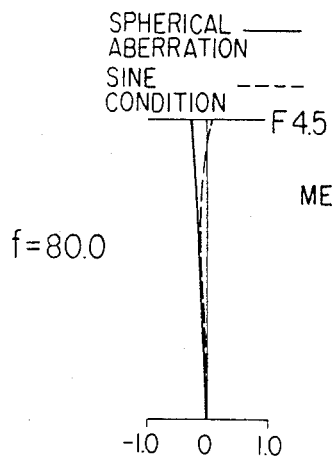
FIG. 11B
ASTIGMATISM
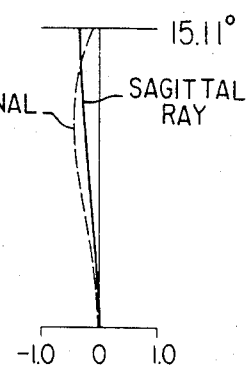
FIG. 11C
DISTORTION
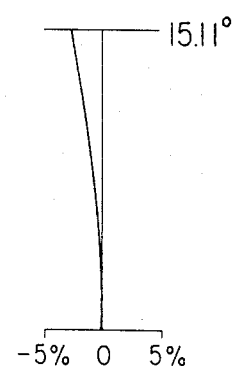
f=127.98
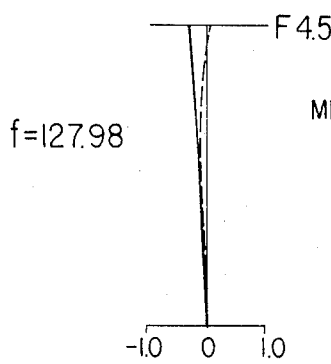
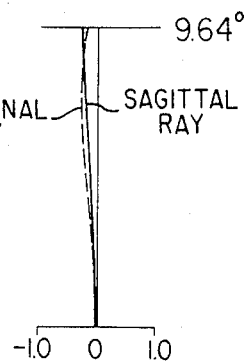
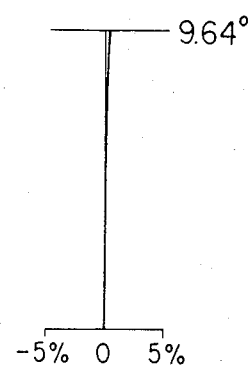
f=196.785
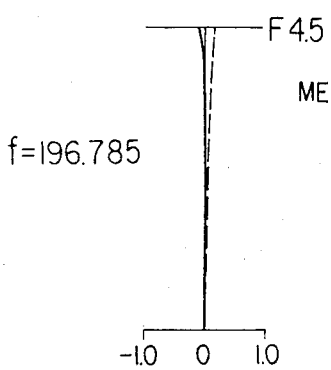
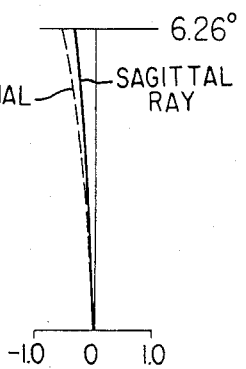
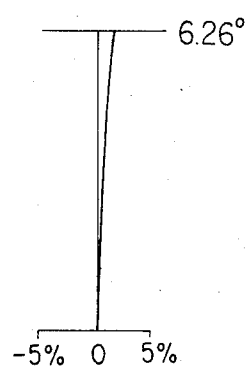

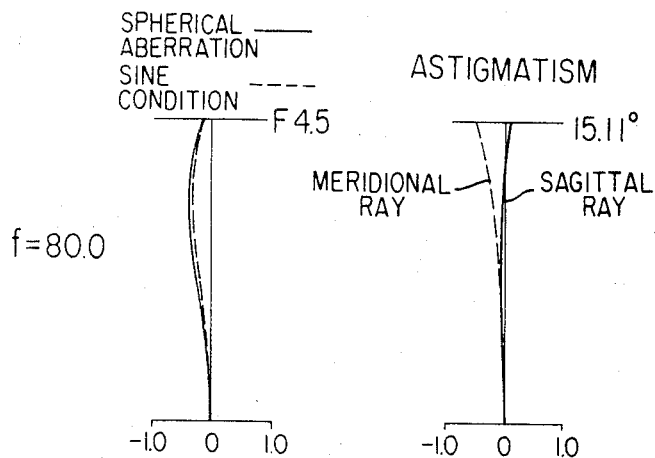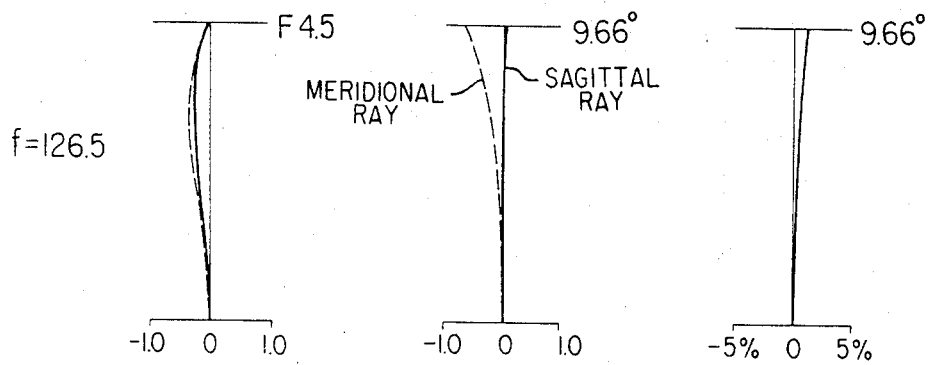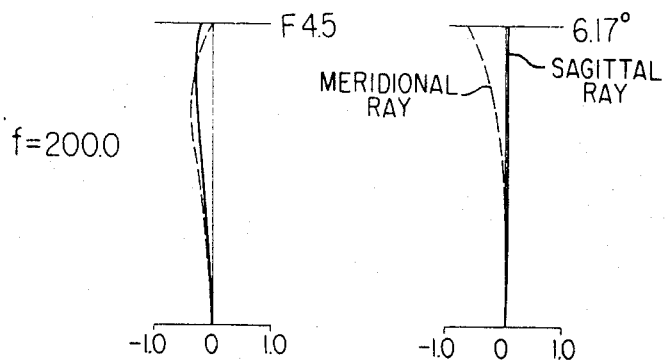

TELEPHOTO ZOOM LENS

Background of the Invention

1. Field of the Invention

The present invention relates to a telephoto zoom lens, and more particularly to a telephoto zoom lens comprising a three-group variable power optical system comprising a positive refracting power focusing lens group, a negative refracting power variation lens group and a positive refracting power compensator lens group, and a relay optical system.

2. Description of the Prior Art

Though the conventional telephoto zoom lenses have been accepted generally for the functions thereof, there has always been a demand for a smaller and lighter telephoto zoom lens because the conventional lenses have been unduly heavy and thus lacked adequate portability. The design efforts which have been directed toward the reduction in the total length of the lens and the minimization of the number of lens components have encountered various difficulties. Although a smaller structure of the variable power lens system is indispensable for reducing the total length of the lens, attempts to reduce the structure by increasing the refracting power of the variator, which is generally considered to be most effective, among the lens groups constituting the variable power system for reduction in the dimensions thereof, inevitably give rise to strongly curved surfaces in the variator constituting lenses, thus leading to aggravated aberrations. Under such conditions, it has been extremely difficult to satisfactorily correct the spherical aberration, coma and astigmatism over the entire zoom range. Also, the total length of the lens can be reduced by employing a telephoto construction in the relay system, but such approach generally requires an increased number of lenses in the relay system itself in order to cancel the astigmatism resulting from the reduced dimension of the variable power system, to satisfactorily correct the remaining spherical aberration and coma, and further to satisfactorily compensate the Petzval's sum negatively increased by the modification in the variable power system. The resulting lens is complicated and heavy.

SUMMARY OF THE INVENTION

The object of the present invention is to provide a telephoto zoom lens consisting of a variable power system comprising three lens groups of positive, negative and positive refracting power, respectively, and a relay system, the zoom lens being minimal in dimensions and weight while being satisfactorily well corrected for the aberrations over the entire zoom range; and further to provide a relay system of a simplified structure adapted for use in such telephoto zoom lens.

BRIEF DESCRIPTION OF THE DRAWINGS

FIGS. 7A, 7B and 7C through 12A, 12B and 12C are aberration charts in various focal length states, respectively, of Examples 1 to 6.

DESCRIPTION OF THE PREFERRED EMBODIMENTS

Figure 1:
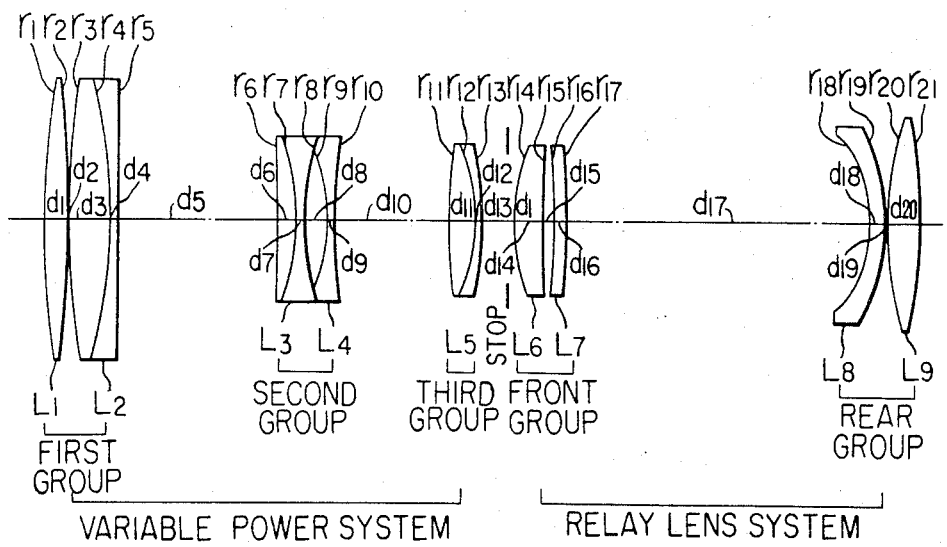
FIGS. 1 to 6 are cross-sectional views of Examples 1 to 6, respectively, of zoom lenses according to the present invention.

In the telephoto zoom lens of the invention, there is a variable power system which includes a first lens group provided with a positive refracting power and capable of focusing by displacement along the optical axis, a second lens group provided with a negative refracting power and capable of continuously varying focal lengths by displacement along the optical axis, and a third lens group provided with a positive refracting power and capable of maintaining the focal position constant regardless of the change in the focal lengths by displacement along the optical axis in cooperation with said second group, the variable power system substantially constituting an afocal system to an infinite object.

The described variable power system is arranged in combination with a relay system which includes, in the order from the object side, a front lens group comprising a positive lens component and a negative lens component which are separated, and a rear lens group comprising a negative meniscus lens component convex to the image side and a positive lens component which are separated, the front and rear groups being separated by a substantial air space.

More particularly, there are provided, in the order from the object side, a first lens group comprising two positive lens components having a positive refractive power in combination and adapted to function as a focusing group for focusing by displacement along the optical axis, a second lens group comprising two negative lens components having a negative refractive power in combination and adapted to function as a variator group for continuously varying the focal length by displacement along the optical axis, and a third lens group comprising at least a positive lens component having a positive refracting power in combination and adapted to function as a compensator group to maintain the focal position constant regardless of the change in the focal length by the displacement along the optical axis in cooperation with said second group. The foregoing three groups constitute the variable power system of a substantially afocal composition to an infinite object. Then, the relay system is provided which includes, in the order from the object side, a front group comprising a positive lens component and a negative lens component which are separated, and a rear group comprising a negative meniscus lens component convex to the image side and a biconvex lens component, the lens components being separated by a substantial air space.

Specifically, the telephoto zoom lens of the invention satisfies the following conditions:

$$0.8 < \frac{f_4}{f_R} < 1.1; \qquad (1)$$

$$0.05 < n_a - n_b < 0.45 \qquad (2)$$

$$0.7 < \frac{f_1}{f_R} < 1.8; \text{ and} \qquad (3)$$

$$-5.0 < \frac{r_a + r_b}{r_a - r_b} < -2.0 \qquad (4)$$

wherein $f_R$ is the composite focal length of the relay system, $f_1$ is the focal length of the aforementioned first group, $f_4$ is the focal length of the front group of the relay system, $n_a$ and $n_b$ are the refractive indices of the positive and negative lens components respectively in the front group, and $r_a$ and $r_b$ are the radii of curvature respectively on the object side and image side of the negative meniscus lens convex to the image side contained in the rear group of the relay system.

Condition (1) defines the distribution of refractive powers among the front and rear groups in the relay system, and functions as a basic for correcting the aggravated aberrations resulting from the dimensional reduction of the variable power system by means of refracting power increase in the groups in said system. A state below the lower limit allows the dimension to be reduced as the telephoto ratio of the relay system itself becomes smaller; however, the correction of aberrations becomes extremely difficult as the refracting power of the front group of the relay system is made excessively large. On the other hand, a state above the upper limit does not satisfy the object of the present invention because of the excessively large total length, though the aberration corrections are facilitated in such state.

Condition (2) is essential in order to improve the Petzval's sum under condition (1). Condition (1) alone is unable to satisfactorily compensate the negatively increased Petzval's sum resulting from the dimensional reduction of the variable power system, thus leaving unsatisfactorily corrected astigmatism. Complete correction can be achieved only when both conditions (1) and (2) are satisfied. A state above the upper limit of condition (2), wherein the difference between the refractive indexes of the positive and negative lens components becomes excessively large, leads to an increased spherical aberration of which correction will require additional lens components contradicting the object of the present invention to achieve a simple structure.

Condition (3) defines the basic relationship between the variable power system and the relay system. A focal length of the first group made smaller than the lower limit of this condition will render the variable power system excessively small, leading to an increase in higher order spherical aberration, coma and chromatic aberration, whereby satisfactory correction of various aberrations over the entire variable power range is rendered extremely difficult. On the other hand, a state above the upper limit of said condition will result in a larger dimension contradicting the object of the present invention to achieve reduced dimension and weight, though the corrections of aberrations become easier in such state.

Condition (4) defines the form of the negative meniscus lens convex to the image side in the rear group of the relay system. States below the lower limit or above the higher limit will result in an excessively large curvature of field in the negative or positive direction. According to condition (4), it is possible to correct the astigmatism generated by the variable power system over the entire variable power range. The image surface characteristics are basically determined by the Petzval's image surface in turn determined by the Petzval's sum controlled in a satisfactorily condition according to condition (2). However, the astigmatism must be further corrected by condition (4).

As explained in the foregoing, the present invention enables sufficient correction of aggravated aberrations resulting from the dimensional reduction of the variable power system through the use of a simple relay system of only four lens components; that is, two components in the front group and two components in the rear group, thereby affording a telephoto zoom lens of excellent performance combined with reduced dimensions and reduced weight. As shown in the following examples, the present invention has enabled the achievement of not only lenses having an F number of 4.5, which is common for conventional lenses, but also lenses having an F number of 2.8, which are surprisingly bright for telephoto zoom lenses of this class.

According to the present invention, it is further preferable that the above-mentioned structure also satisfy the following conditions:

$$-3.6 < \frac{f_1}{f_2} < -2.5; \text{ and} \quad (5)$$

$$0.5 < \frac{r_c + r_d}{r_c - r_d} < 2.5; \quad (6)$$

wherein $f_2$ is the focal length of the aforementioned second group, and $r_c$ and $r_d$ are the radii of curvature respectively on the object side and the image side of the negative lens component located at the object side in the second group.

Condition (5) defines the mutual relationship of the displacements of the second variator group and the third compensator group for zooming, while maintaining the variable power system substantially afocal to an infinite object. A state below the lower limit of the condition will increase the amount of displacement of the compensator group, thus rendering the dimensional reduction of the system difficult. On the other hand, in a state above the upper limit of this condition, the displacement curve of the compensator group will involve a rapid reversing movement at the longer focal length side, thus complicating the structure of the lens tube and rendering the manufacture thereof difficult. With regard to the aberrations, a state below the lower limit will result in a deteriorated Petzval's sum, and it will be difficult to correct astigmatism in satisfactory balance with other aberrations. Furthermore, it will become difficult to suitably correct the spherical aberration, together with chromatic aberration and coma over the entire variable power range. On the other hand, a state above the upper limit will result in the above-mentioned mechanical difficulties though in such state the correction of aberrations become easier.

Condition (6) functions to avoid excessively large negative distortion at the short focal length side; also, to maintain a better balance between the image surface at both extremities of the variable power range. In a state below the lower limit, there will be observed a significant negative distortion at the short focal length side which cannot be corrected by other components and which is excessively distant from the distortion at the long focal length side. On the other hand, in a state above the upper limit, it will be difficult to maintain the balance of the image surface over the entire variable power range though the negative distortion at the short focal length can be suppressed.

Figure 2:
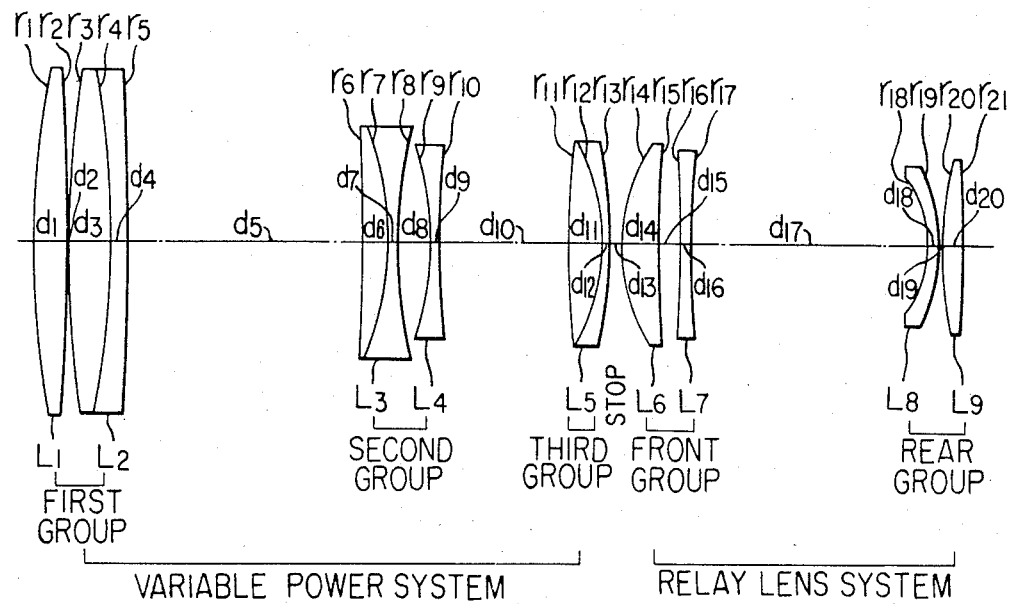

Now there will be given an explanation of the specific examples of the present invention. In the first and second examples shown in FIGS. 1 and 2 respectively, there are employed a relay system of the aforementioned structure and a variable power system. The first group of each variable power system is composed of a positive lens component L1 and a cemented positive lens component L2, the second group is composed of a cemented negative lens component L3 and a negative lens component L4, and the third group includes a cemented positive lens component L5. Embodiment 1 as shown in FIG. 1 represents the basic form of the present invention and furnishes a telephoto zoom lens for a 35 mm still camera of a focal length of 80-200 mm with an F number of 4.5. The lens of this embodiment having a telephoto ratio (ratio of the distance from the forward lens surface to focal plane to the longest focal length) of 1.0 or more, is designed so that it is smaller in construction than prior art telephoto zoom lenses of this type. Embodiment 2 achieves an F number of 2.8 with a focal length range of 80-200 mm with a lens structure identical to that employed in embodiment 1.

In embodiment 2 the length of the relay system remains substantially the same as in embodiment 1, though the variable power system is somewhat larger, thus providing the excellent performance of the relay system of the present invention. Though in embodiment 2 the entire dimension is somewhat larger with a telephoto ratio of 1.174 due to the F number being as high as 2.8, it is possible to retain a telephoto ratio of only approximately 1.0 if the F number is reduced to 3.5.

FIGS. 7A, 7B, 7C and 8A, 8B and 8C indicate that the aberrations in embodiments 1 and 2 are satisfactorily corrected for various focal lengths. In the following there are given the numerical data for embodiments 1 and 2 shown in FIGS. 1 and 2 respectively wherein $r_1$, $r_2$, $r_3$, ... are the radii of curvature of the refracting surfaces of the lenses in the order from the object side; $d_1$, $d_2$, $d_3$, ... the axial thicknesses and air spaces of the lenses; $n_1$, $n_2$, $n_3$, ... and $v_1$, $v_2$, ... respectively the refractive indexes to spectrum line d and Abbe number of the lenses; f the composite focal length of the entire system; and B.F. the back focus.

Embodiment 1
f: 80.0-126.50-200.0 F number: 4.5
B.f.: 42.495-42.495-42.495
telephoto ratio: 0.987

| | | | | | | | |
|---|---|---|---|---|---|---|---|
| $f_1$ | $r_1$ | 131.893 | $d_1$ | 4.5 | $n_1$ | 1.56384 | $v_1$ 60.8 |
| | $r_2$ | −428.120 | $d_2$ | 0.1 | | | |
| | $r_3$ | 166.732 | $d_3$ | 7.3 | $n_2$ | 1.60311 | $v_2$ 60.7 |
| | $r_4$ | −128.331 | $d_4$ | 2.0 | $n_3$ | 1.80518 | $v_3$ 25.5 |
| | $r_5$ | −1348.930 | $d_5$ | 3.229-28.213-44.014 | | | |
| $f_2$ | $r_6$ | −280.000 | $d_6$ | 3.4 | $n_4$ | 1.7552 | $v_4$ 27.5 |
| | $r_7$ | −39.000 | $d_7$ | 0.9 | $n_5$ | 1.5168 | $v_5$ 64.2 |
| | $r_8$ | 52.182 | $d_8$ | 4.1 | | | |
| | $r_9$ | −39.470 | $d_9$ | 1.1 | $n_6$ | 1.58913 | $v_6$ 61.2 |
| | $r_{10}$ | 126.118 | $d_{10}$ | 32.195-20.247-1.355 | | | |
| $f_3$ | $r_{11}$ | 171.444 | $d_{11}$ | 4.15 | $n_7$ | 1.62041 | $v_7$ 60.3 |
| | $r_{12}$ | −33.125 | $d_{12}$ | 0.9 | $n_8$ | 1.7552 | $v_8$ 27.5 |
| | $r_{13}$ | −67.765 | $d_{13}$ | 19.006-5.970-9.060 | | | |
| $f_R$ $f_4$ | $r_{14}$ | 38.04 | $d_{14}$ | 5.3 | $n_9$ | 1.5168 | $v_9$ 64.2 |
| | $r_{15}$ | 795.392 | $d_{15}$ | 1.0 | | | |
| | $r_{16}$ | −151.741 | $d_{16}$ | 2.0 | $n_{10}$ | 1.75692 | $v_{10}$ 31.7 |
| | $r_{17}$ | −582.0 | $d_{17}$ | 55.8 | | | |
| $f_5$ | $r_{18}$ | −23.129 | $d_{18}$ | 2.4 | $n_{11}$ | 1.71300 | $v_{11}$ 53.9 |
| | $r_{19}$ | −39.626 | $d_{19}$ | 0.2 | | | |
| | $r_{20}$ | 68.585 | $d_{20}$ | 5.3 | $n_{12}$ | 1.51823 | $v_{12}$ 59.0 |
| | $r_{21}$ | −138.190 | | | | | |

Focal lengths of constituent groups:
1st group—$f_1$:121.605
2nd group—$f_2$:−37.384
3rd group—$f_3$:94.067
relay system front group—$f_4$:107.181
relay system rear group—$f_5$:6666.670
relay system combined—$f_R$:112.523

Embodiment 2
f: 80.0-140.0-200.0 F number: 2.8
B.f.: 40.058-40.058-40.058
telephoto ratio: 1.174

| | | | | | | | |
|---|---|---|---|---|---|---|---|
| $f_1$ | $r_1$ | 208.000 | $d_1$ | 7.0 | $n_1$ | 1.56384 | $v_1$ 60.8 |
| | $r_2$ | −670.997 | $d_2$ | 0.5 | | | |
| | $r_3$ | 270.000 | $d_3$ | 8.8 | $n_2$ | 1.58913 | $v_2$ 61.2 |
| | $r_4$ | −189.000 | $d_4$ | 3.1 | $n_3$ | 1.80518 | $v_3$ 25.5 |
| | $r_5$ | −1224.803 | $d_5$ | 2.602-49.422-68.150 | | | |
| $f_2$ | $r_6$ | −400.000 | $d_6$ | 5.45 | $n_4$ | 1.75520 | $v_4$ 27.5 |
| | $r_7$ | −62.670 | $d_7$ | 1.45 | $n_5$ | 1.51680 | $v_5$ 64.2 |
| | $r_8$ | 83.100 | $d_8$ | 7.5 | | | |
| | $r_9$ | −63.100 | $d_9$ | 1.75 | $n_6$ | 1.58913 | $v_6$ 61.2 |
| | $r_{10}$ | 232.646 | $d_{10}$ | 51.700-26.918-2.137 | | | |
| $f_3$ | $r_{10}$ | 230.000 | $d_{11}$ | 7.0 | $n_7$ | 1.65830 | $v_7$ 57.3 |
| | $r_{12}$ | −47.500 | $d_{12}$ | 1.45 | $n_8$ | 1.79504 | $v_8$ 28.4 |
| | $r_{13}$ | −119.067 | $d_{13}$ | 24.771-2.733-8.787 | | | |
| $f_R$ $f_4$ | $r_{14}$ | 42.650 | $d_{14}$ | 7.5 | $n_9$ | 1.67025 | $v_9$ 57.5 |
| | $r_{15}$ | 227.085 | $d_{15}$ | 4.3 | | | |
| | $r_{16}$ | −525.000 | $d_{16}$ | 2.5 | $n_{10}$ | 1.80518 | $v_{10}$ 25.5 |
| | $r_{17}$ | 362.749 | $d_{17}$ | 50.2 | | | |
| $f_5$ | $r_{18}$ | −24.100 | $d_{18}$ | 2.4 | $n_{11}$ | 1.71300 | $v_{11}$ 53.9 |
| | $r_{19}$ | −42.323 | $d_{19}$ | 0.4 | | | |
| | $r_{20}$ | 88.000 | $d_{20}$ | 4.3 | $n_{12}$ | 1.77279 | $v_{12}$ 49.7 |
| | $r_{21}$ | −653.578 | $d_{21}$ | | | | |

Focal lengths of constituent groups:
1st group—$f_1$:191.437
2nd group—$f_2$:−60.081
3rd group—$f_3$:151.179
relay system front group—$f_4$:102.791
relay system rear group—$f_5$:−622.326
relay system combined—$f_R$:114.874

Figure 3:
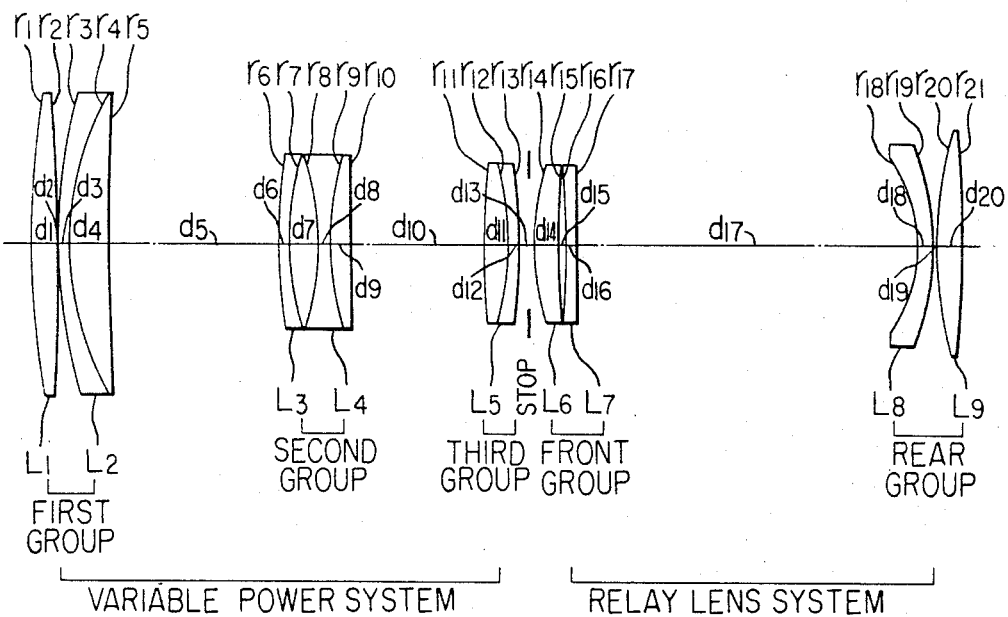
Figure 4:
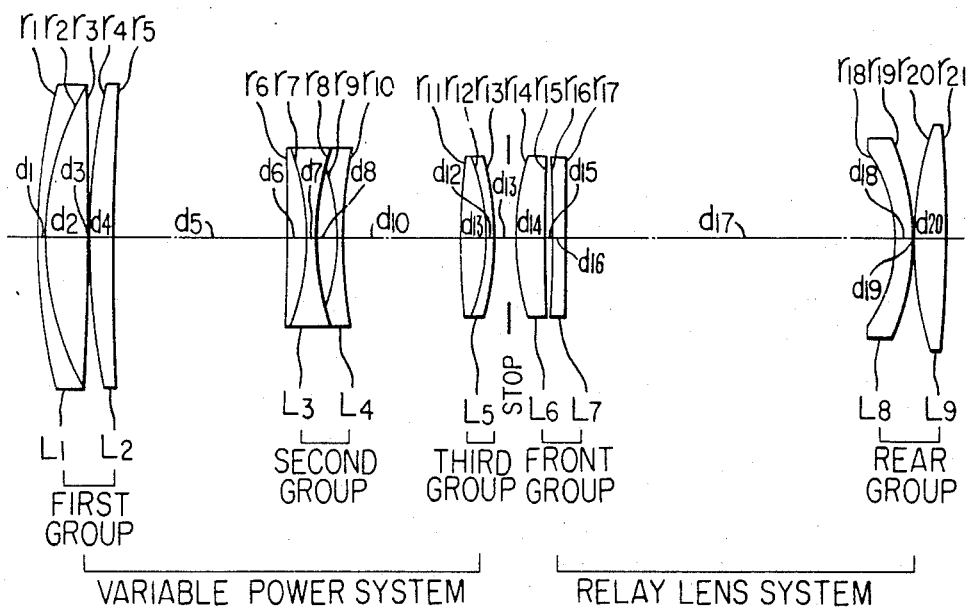
Figure 5:
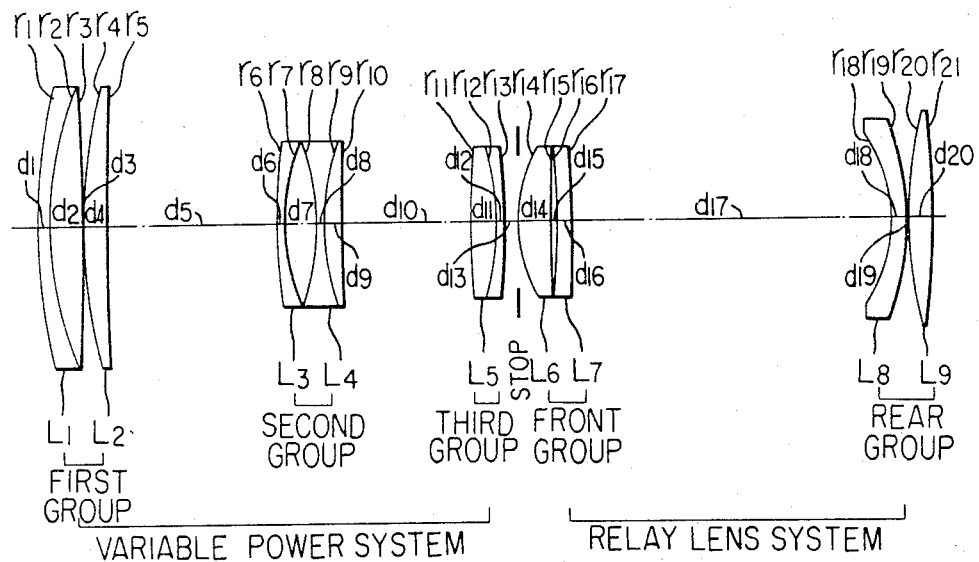

In contrast to the aforementioned embodiments 1 and 2 wherein cemented lenses are employed in the lens component at the image side in the first group and in the lens component at the object side in the second group, embodiment 3 shown in FIG. 3 employs a cemented lens in the lens component at the image side in the second group. Also, embodiment 4 shown in FIG. 4 employs a cemented lens in the lens component at the object side in the first group. Embodiment 5 shown in FIG. 5 employs a structure wherein the positions of cemented lens components in the first and second groups are inverted with respect to those in embodiments 1 and 2. Embodiments 3, 4 and 5, which are provided with a focal length variable range of 80-200 mm and with a F number of 4.5, indicate that the simplified relay system as employed in embodiments 1 and 2 is satisfactorily applicable even when the compositions of constituent groups in the variable power system are changed.

Figure 6:
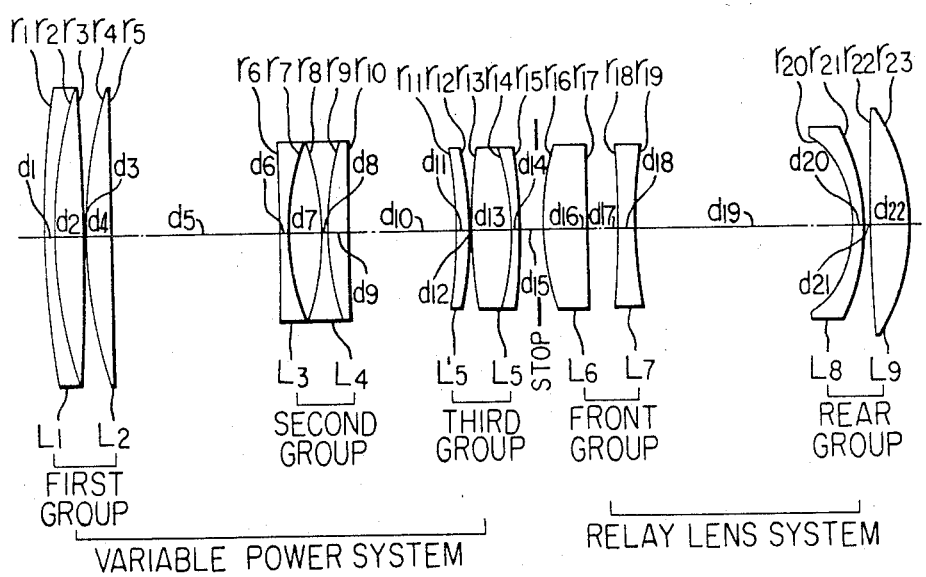

Embodiment 6 shown in FIG. 6 employs first and second groups similar to those employed in embodiment 5 combined with a third group with a relatively increased refracting power to enable very short distance photography with an image magnification up to ½, wherein the refracting power of the third group is distributed between the lenses L'5 and L5 to achieve satisfactory corrections of aberrations. The lens of this embodiment also is provided with a focal length variable range of 80-200 mm and with a F number of 4.5, and the very short distance photography is achieved by displacing the third group toward the image side by 20 mm in the shortest focal length state, whereby the distance to the object is 87 mm and the image magnification is 0.5. In the following there are given the numerical data for embodiments 3, 4, 5 and 6, the aberrations for which are respectively shown in FIGS. 9A, 9B and 9C through 12A, 12B and 12C, wherein $r_1, r_2, r_3, \ldots$ are the radii of curvature of the refracting surfaces of the lenses in the order from the object side; $d_1, d_2, d_3, \ldots$ the axial thicknesses and air spaces of the lenses; $n_1, n_2, \ldots$ and $v_1, v_2, \ldots$ respectively the refractive indexes to spectrum line d and Abbe number of the lenses; f the composite focal length of the entire system; and B.F. the back focus.

Embodiment 3
f: 80.0-127.98-196.785  F number: 4.5
B.F.: 45.952-45.952-45.952
telephoto ratio: 1.013

| | | | | | | | |
|---|---|---|---|---|---|---|---|
| $f_1$ | $r_1$ | 169.300 | $d_1$ 4.00 | $n_1$ 1.51680 | $v_1$ 64.2 | | |
| | $r_2$ | −594.270 | $d_2$ 0.12 | | | | |
| | $r_3$ | 92.560 | $d_3$ 1.65 | $n_2$ 1.75570 | $v_2$ 27.2 | | |
| | $r_4$ | 51.260 | $d_4$ 6.85 | $n_3$ 1.61375 | $v_3$ 56.3 | | |
| | $r_5$ | 591.773 | $d_5$ 5.313-29.313-43.313 | | | | |
| $f_2$ | $r_6$ | 124.160 | $d_6$ 1.33 | $n_4$ 1.72000 | $v_4$ 52.0 | | |
| | $r_7$ | 39.930 | $d_7$ 5.07 | | | | |
| | $r_8$ | −45.100 | $d_8$ 1.24 | $n_5$ 1.60000 | $v_5$ 64.2 | | |
| | $r_9$ | 41.070 | $d_9$ 3.20 | $n_6$ 1.76182 | $v_6$ 26.5 | | |
| | $r_{10}$ | 290.359 | $d_{10}$ 38.296-23.197-1.532 | | | | |
| $f_3$ | $r_{11}$ | 164.560 | $d_{11}$ 4.50 | $n_7$ 1.62041 | $v_7$ 60.3 | | |
| | $r_{12}$ | −26.000 | $d_{12}$ 1.25 | $n_8$ 1.62004 | $v_8$ 3.63 | | |
| | $r_{13}$ | −116.319 | $d_{13}$ 11.078-2.177-9.870 | | | | |
| $f_R$ { $f_4$ | $r_{14}$ | 43.000 | $d_{14}$ 5.3 | $n_9$ 1.56384 | $v_9$ 60.8 | | |
| | $r_{15}$ | 942.715 | $d_{15}$ 1.0 | | | | |
| | $r_{16}$ | −153.439 | $d_{16}$ 2.0 | $n_{10}$ 1.74950 | $v_{10}$ 35.0 | | |
| | $r_{17}$ | −587.550 | $d_{17}$ 57.80 | | | | |
| $f_5$ | $r_{18}$ | −24.100 | $d_{18}$ 2.4 | $n_{11}$ 1.71300 | $v_{11}$ 53.9 | | |
| | $r_{19}$ | −40.069 | $d_{19}$ 0.2 | | | | |
| | $r_{20}$ | 75.813 | $d_{20}$ 4.0 | $n_{12}$ 1.51823 | $v_{12}$ 59.0 | | |
| | $r_{21}$ | −151.000 | | | | | |

Focal lengths of constituent groups:
1st group—$f_1$:120.192
2nd group—$f_2$:−40.158
3rd group—$f_3$:110.664
relay system front group—$f_4$:109.576
relay system rear group—$f_5$:−3313.715
relay system combined—$f_R$:117.244

Embodiment 4
f: 80.0-126.49-200.0  F number: 4.5
B.F.: 43.453-43,453-43,453
telephoto ratio: 0.977

| | | | | | | |
|---|---|---|---|---|---|---|
| $f_1$ | $r_1$ | 104.890 | $d_1$ 1.65 | $n_1$ 1.7552 | $v_1$ 27.5 | |
| | $r_2$ | 59.030 | $d_2$ 6.85 | $n_2$ 1.61375 | $v_2$ 56.3 | |
| | $r_3$ | −1109.130 | $d_3$ 0.12 | | | |
| | $r_4$ | 144.500 | $d_4$ 4.0 | $n_3$ 1.5168 | $v_3$ 64.2 | |
| | $r_5$ | 1017.259 | $d_5$ 4.621-29.605-45.406 | | | |
| $f_2$ | $r_6$ | −280.000 | $d_6$ 3.4 | $n_4$ 1.7552 | $v_4$ 27.5 | |
| | $r_7$ | −39.060 | $d_7$ 0.9 | $n_5$ 1.5168 | $v_5$ 64.2 | |
| | $r_8$ | 52.030 | $d_8$ 4.1 | | | |
| | $r_9$ | −39.500 | $d_9$ 1.1 | $n_6$ 1.58913 | $v_6$ 61.2 | |
| | $r_{10}$ | 126.630 | $d_{10}$ 32.186-20.238-1.346 | | | |
| $f_3$ | $r_{11}$ | 171.444 | $d_{11}$ 4.15 | $n_7$ 1.62041 | $v_7$ 60.3 | |
| | $r_{12}$ | −32.52 | $d_{12}$ 0.9 | $n_8$ 1.7552 | $v_8$ 27.5 | |
| | $r_{13}$ | −67.311 | $d_{13}$ 16.079-3.043-6.134 | | | |
| $f_R$ { $f_4$ | $r_{14}$ | 38.040 | $d_{14}$ 5.3 | $n_9$ 1.5168 | $v_9$ 64.2 | |
| | $r_{15}$ | 795.392 | $d_{15}$ 1.0 | | | |
| | $r_{16}$ | −165.900 | $d_{16}$ 2.0 | $n_{10}$ 1.7495 | $v_{10}$ 35.0 | |
| | $r_{17}$ | −1158.259 | $d_{17}$ 55.8 | | | |
| $f_5$ | $r_{18}$ | −23.200 | $d_{18}$ 2.4 | $n_{11}$ 1.713 | $v_{11}$ 53.9 | |
| | $r_{19}$ | −37.916 | $d_{19}$ 0.2 | | | |
| | $r_{20}$ | 67.838 | $d_{20}$ 5.3 | $n_{12}$ 1.51823 | $v_{12}$ 59.0 | |
| | $r_{21}$ | −166.027 | | | | |

Focal length of constituent groups:
1st group—$f_1$:121.605
2nd group—$f_2$:−37.384
3rd group—$f_3$:94.067
relay system front group—$f_4$:107.255
relay system rear group—$f_5$:6110.540
relay system combined—$f_R$:112.523

Embodiment 5
f: 80.0-127.98-196.785  F number: 4.5
B.f.: 45.881-45.881-45.881
telephoto ratio: 1.017

| | | | | | | |
|---|---|---|---|---|---|---|
| $f_1$ | $r_1$ | 104.890 | $d_1$ 1.65 | $n_1$ 1.75570 | $v_1$ 27.2 | |
| | $r_2$ | 56.030 | $d_2$ 6.85 | $n_2$ 1.61375 | $v_2$ 56.3 | |
| | $r_3$ | −1109.130 | $d_3$ 0.12 | | | |
| | $r_4$ | 128.230 | $d_4$ 4.00 | $n_3$ 1.51680 | $v_3$ 64.2 | |
| | $r_5$ | 657.620 | $d_5$ 6.317-30.317-44.317 | | | |
| $f_2$ | $r_6$ | 123.190 | $d_6$ 1.33 | $n_4$ 1.72000 | $v_4$ 52.0 | |
| | $r_7$ | 39.110 | $d_7$ 5.38 | | | |
| | $r_8$ | −44.050 | $d_8$ 1.24 | $n_5$ 1.60000 | $v_5$ 64.2 | |
| | $r_9$ | 41.860 | $d_9$ 3.20 | $n_6$ 1.76182 | $v_6$ 26.5 | |
| | $r_{10}$ | 401.440 | $d_{10}$ 37.867-22.768-1.103 | | | |
| $f_3$ | $r_{11}$ | 180.000 | $d_{11}$ 4.5 | $n_7$ 1.62041 | $v_7$ 60.3 | |
| | $r_{12}$ | −51.240 | $d_{12}$ 1.25 | $n_8$ 1.62004 | $v_8$ 36.3 | |
| | $r_{13}$ | −109.709 | $d_{13}$ 11.205-2.304-9.997 | | | |
| $f_R$ { $f_4$ | $r_{14}$ | 43.000 | $d_{14}$ 5.3 | $n_9$ 1.56384 | $v_9$ 60.8 | |
| | $r_{15}$ | 942.715 | $d_{15}$ 1.0 | | | |
| | $r_{16}$ | −153.439 | $d_{16}$ 2.0 | $n_{10}$ 1.74950 | $v_{10}$ 35.0 | |
| | $r_{17}$ | −587.550 | $d_{17}$ 57.80 | | | |
| $f_5$ | $r_{18}$ | −24.400 | $d_{18}$ 2.4 | $n_{11}$ 1.71300 | $v_{11}$ 53.9 | |
| | $r_{19}$ | −40.069 | $d_{19}$ 0.2 | | | |
| | $r_{20}$ | 75.813 | $d_{20}$ 4.0 | $n_{12}$ 1.51823 | $v_{12}$ 59.0 | |
| | $r_{21}$ | −168.690 | | | | |

Focal lengths of constituent groups
1st group—$f_1$: 120.192
2nd group—$f_2$: −40.158
3rd group—$f_3$: 110.664
relay system front group—$f_4$: 109.576
relay system rear group—$f_5$: −2984.698
relay system combined—$f_R$: 117.244

Embodiment 6
f: 80.0-126.50-200.0  F number 4.5
B.f.: 54.181-54.181-54.181
telephoto ratio: 0.996

| | | | | | | |
|---|---|---|---|---|---|---|
| $f_1$ | $r_1$ | 164.587 | $d_1$ 1.8 | $n_1$ 1.80518 | $v_1$ 25.5 | |
| | $r_2$ | 78.777 | $d_2$ 5.0 | $n_2$ 1.52 | $v_2$ 70.1 | |
| | $r_3$ | −495.132 | $d_3$ 0.1 | | | |
| | $r_4$ | 80.5 | $d_4$ 4.5 | $n_3$ 1.51118 | $v_3$ 50.9 | |
| | $r_5$ | ∞ | $d_5$ 1.367-28.089-44.989 | | | |
| $f_2$ | $r_6$ | −3000.000 | $d_6$ 1.3 | $n_4$ 1.713 | $v_4$ 53.9 | |
| | $r_7$ | 39.377 | $d_7$ 5.7 | | | |
| | $r_8$ | −46.793 | $d_8$ 1.1 | $n_5$ 1.58913 | $v_5$ 61.2 | |
| | $r_9$ | 47.803 | $d_9$ 3.7 | $n_6$ 1.80518 | $v_6$ 25.5 | |
| | $r_{10}$ | 858.884 | $d_{10}$ 27.304-17.304-1.492 | | | |
| $f_3$ | $r_{11}$ | −137.843 | $d_{11}$ 3.0 | $n_7$ 1.50137 | $v_7$ 56.5 | |
| | $r_{12}$ | −78.921 | $d_{12}$ 0.1 | | | |
| | $r_{13}$ | 103.905 | $d_{13}$ 6.6 | $n_8$ 1.52 | $v_8$ 70.1 | |
| | $r_{14}$ | −51.174 | $d_{14}$ 1.3 | $n_9$ 1.75692 | $v_9$ 31.7 | |
| | $r_{15}$ | −95.355 | $d_{15}$ 20.568-3.846-2.758 | | | |
| $f_R$ { $f_4$ | $r_{16}$ | 32.050 | $d_{16}$ 7.73 | $n_{10}$ 1.6583 | $v_{10}$ 57.3 | |
| | $r_{17}$ | −6557.936 | $d_{17}$ 5.15 | | | |
| | $r_{18}$ | −151.186 | $d_{18}$ 2.9 | $n_{11}$ 1.74077 | $v_{11}$ 27.7 | |
| | $r_{19}$ | 77.279 | $d_{19}$ 37.35 | | | |
| $f_5$ | $r_{20}$ | −17.620 | $d_{20}$ 1.45 | $n_{12}$ 1.76684 | $v_{12}$ 46.6 | |
| | $r_{21}$ | −32.000 | $d_{21}$ 0.8 | | | |
| | $r_{22}$ | 500.000 | $d_{22}$ 6.28 | $n_{13}$ 1.54072 | $v_{13}$ 47.2 | |
| | $r_{23}$ | −37.738 | | | | |

Focal lengths of constituent groups:

1st group—$f_1$: 116.052
2nd group—$f_2$: −35.371
3rd group—$f_3$: 90.899
relay system front group—$f_4$: 107.088
relay system rear group—$f_5$: −673.394
relay system combined—$f_R$: 128.798

It is believed that the advantages and improved results afforded by the telephoto zoom lens of the invention will be apparent from the foregoing description of several embodiments thereof. Various changes and modifications may be made without departing from the spirit and scope of the invention as sought to be defined in the claims.

We claim:

1. A telephoto zoom lens comprising a variable power system including a first group provided with a positive refracting power and capable of focusing by displacement along the optical axis, a second group provided with a negative refracting power and capable of continuously varying focal length by displacement along the optical axis and a third group provided with a positive refracting power and capable of maintaining the focal position constant regardless of the change in the focal length by displacement along the optical axis in cooperation with said second group, said system substantially constituting an afocal system to an infinite object; and a relay system including, in the order from the object side, a front group consisting of a positive lens component and a negative lens component which are separated, and a rear group consisting of a negative meniscus lens component convex to the image side and a positive lens component which are separated, the front and rear groups being separated by a substantial air space.

2. A telephoto zoom lens according to claim 1, wherein said first group comprises two positive lens components of which one is a cemented lens.

3. A telephoto zoom lens according to claim 2, wherein said second group comprises two negative lens components of which one is a cemented lens.

4. A telephoto zoom lens according to claim 3, wherein said third group includes a cemented positive lens component.

5. A telephoto zoom lens according to claim 4, satisfying the conditions:

$$0.8 < \frac{f_4}{f_R} < 1.1;$$
$$0.05 < n_a - n_b < 0.45;$$
$$0.7 < \frac{f_1}{f_R} < 1.8; \text{ and}$$
$$-5.0 < \frac{r_a + r_b}{r_a - r_b} < -2.0;$$

wherein $f_R$ is the composite focal length of the relay system, $f_1$ is the focal length of said first group, $f_4$ is the focal length of the front group of the relay system, $n_a$ and $n_b$ are the refractive indexes of the positive and negative lens components, respectively, in the front group, and $r_a$ and $r_b$ are the radii of curvature, respectively, on the object side and image side of the negative meniscus lens convex to the image side in the rear group of the relay system.

6. A telephoto zoom lens according to claim 5, further satisfying the conditions:

$$-3.6 < \frac{f_1}{f_2} < -2.5$$
$$0.5 < \frac{r_c + r_d}{r_c - r_d} < 2.5$$

wherein $f_2$ is the focal length of said second group, and $r_c$ and $r_d$ are the radii of curvature, respectively, on the object side and image side of the negative lens component located on the object side in said second group.

7. A telephoto zoom lens according to claim 6, wherein the positive lens component located on the image side in said first group is a cemented lens.

8. A telephoto zoom lens according to claim 7, wherein the negative lens component located on the object side in said second group is a cemented lens.

9. A telephoto zoom lens according to claim 8 further comprising the following parameters:

f: 80.0−126.50−200.0  F number: 4.5
B.f.: 42.495−42.495−42.495
telephoto ratio: 0.987

| | | | | | | | | |
|---|---|---|---|---|---|---|---|---|
| $f_1$ | $r_1$ | 131.893 | $d_1$ | 4.5 | | $n_1$ 1.56384 | $v_1$ | 60.8 |
| | $r_2$ | −428.120 | $d_2$ | 0.1 | | | | |
| | $r_3$ | 166.732 | $d_3$ | 7.3 | | $n_2$ 1.60311 | $v_2$ | 60.7 |
| | $r_4$ | −128.331 | $d_4$ | 2.0 | | $n_3$ 1.80518 | $v_3$ | 25.5 |
| | $r_5$ | −1348.930 | $d_5$ | 3.229−28.313−44.014 | | | | |
| $f_2$ | $r_6$ | −280.000 | $d_6$ | 3.4 | | $n_4$ 1.7552 | $v_4$ | 27.5 |
| | $r_7$ | −39.000 | $d_7$ | 0.9 | | $n_5$ 1.5168 | $v_5$ | 64.2 |
| | $r_8$ | 52.182 | $d_8$ | 4.1 | | | | |
| | $r_9$ | −39.470 | $d_9$ | 1.1 | | $n_6$ 1.58913 | $v_6$ | 61.2 |
| | $r_{10}$ | 126.118 | $d_{10}$ | 32.195−20.247−1.355 | | | | |
| $f_3$ | $r_{11}$ | 171.444 | $d_{11}$ | 4.15 | | $n_7$ 1.62041 | $v_7$ | 60.3 |
| | $r_{12}$ | −33.125 | $d_{12}$ | 0.9 | | $n_8$ 1.7552 | $v_8$ | 27.5 |
| | $r_{13}$ | −67.765 | $d_{13}$ | 19.006−5.970−9.060 | | | | |
| $f_R$ { $f_4$ | $r_{14}$ | 38.04 | $d_{14}$ | 5.3 | | $n_9$ 1.5168 | $v_9$ | 64.2 |
| | $r_{15}$ | 795.392 | $d_{15}$ | 1.0 | | | | |
| | $r_{16}$ | −151.741 | $d_{16}$ | 2.0 | | $n_{10}$ 1.75692 | $v_{10}$ | 31.7 |
| | $r_{17}$ | −582.0 | $d_{17}$ | 55.8 | | | | |
| $f_5$ | $r_{18}$ | −23.129 | $d_{18}$ | 2.4 | | $n_{11}$ 1.71300 | $v_{11}$ | 53.9 |
| | $r_{19}$ | −39.626 | $d_{19}$ | 0.2 | | | | |
| | $r_{20}$ | 68.585 | $d_{20}$ | 5.3 | | $n_{12}$ 1.51823 | $v_{12}$ | 59.0 |
| | $r_{21}$ | −138.190 | | | | | | | focal lengths of constituent groups:
1st group—$f_1$: 121.605
2nd group—$f_2$: −37.384
3rd group—$f_3$: 94.067
relay system front group—$f_4$: 107.181
relay system rear group—$f_5$: 6666.670
relay system combined—$f_R$: 112.523 wherein $r_1$, $r_2$, $r_3$, ... are the radii of curvature of the refracting surfaces of the lenses in the order from the object side; $d_1$, $d_2$, $d_3$, ... the axial thicknesses and air spaces of the lenses; $n_1$, $n_2$, ... and $v_1$, $v_2$, ... respectively the refractive indexes to spectrum line d and Abbe number of the lenses; f the composite focal length of the entire system; and B.f. the back focus.

10. A telephoto zoom lens according to claim 8 further comprising the following parameters:

f: 80.0−140.0−200.0  F number: 2.8
B.f.: 40.058−40.058−40.058
telephoto ratio: 1.174

| | | | | | | | | |
|---|---|---|---|---|---|---|---|---|
| $f_1$ | $r_1$ | 208.000 | $d_1$ | 7.0 | | $n_1$ 1.56384 | $v_1$ | 60.8 |
| | $r_2$ | −670.997 | $d_2$ | 0.5 | | | | |
| | $r_3$ | 270.000 | $d_3$ | 8.8 | | $n_2$ 1.58913 | $v_2$ | 61.2 |
| | $r_4$ | −189.000 | $d_4$ | 3.1 | | $n_3$ 1.80518 | $v_3$ | 25.5 |
| | $r_5$ | −1224.803 | $d_5$ | 2.602−49.422−68.150 | | | | |

-continued f: 80.0-140.0-200.0   F number: 2.8
B.f.: 40.058-40.058-40.058
telephoto ratio: 1.174

$f_R \begin{cases} f_2 \begin{cases} r_6 & -400.000 & d_6 & 5.45 & n_4 & 1.75520 & v_4 & 27.5 \\ r_7 & -62.670 & d_7 & 1.45 & n_5 & 1.51680 & v_5 & 64.2 \\ r_8 & 83.100 & d_8 & 7.5 \\ r_9 & -63.100 & d_9 & 1.75 & n_6 & 1.58913 & v_6 & 61.2 \\ r_{10} & 232.646 & d_{10} & 51.700\text{-}26.918\text{-}2.137 \end{cases} \\ f_3 \begin{cases} r_{11} & 230.000 & d_{11} & 7.0 & n_7 & 1.65830 & v_7 & 57.3 \\ r_{12} & -47.500 & d_{12} & 1.45 & n_8 & 1.79504 & v_8 & 28.4 \\ r_{13} & -119.067 & d_{13} & 24.771\text{-}2.733\text{-}8.787 \end{cases} \\ f_4 \begin{cases} r_{14} & 42.650 & d_{14} & 7.5 & n_9 & 1.67025 & v_9 & 57.5 \\ r_{15} & 227.085 & d_{15} & 4.3 \\ r_{16} & -525.000 & d_{16} & 2.5 & n_{10} & 1.80518 & v_{10} & 25.5 \\ r_{17} & 362.749 & d_{17} & 50.2 \end{cases} \\ f_5 \begin{cases} r_{18} & -24.100 & d_{18} & 2.4 & n_{11} & 1.71300 & v_{11} & 53.9 \\ r_{19} & -42.323 & d_{19} & 0.4 \\ r_{20} & 88.000 & d_{20} & 4.3 & n_{12} & 1.77279 & v_{12} & 49.7 \\ r_{21} & -653.578 & d_{21} \end{cases} \end{cases}$ focal lengths of constituent groups:
 1st group—$f_1$: 191.437
 2nd group—$f_2$: −60.081
 3rd group—$f_3$: 151.179
 relay system front group—$f_4$: 102.791
 relay system rear group—$f_5$: −622.326
 relay system combined—$f_R$: 114.874 wherein $r_1, r_2, r_3, \ldots$ are the radii of curvature of the refracting surfaces of the lenses in the order from the object side; $d_1, d_2, d_3, \ldots$ the axial thicknesses and air spaces of the lenses; $n_1, n_2, \ldots$ and $v_1, v_2, \ldots$ respectively the refractive indexes to spectrum line d and Abbe number of the lenses; f the composite focal length of the entire system; and B.f. the back focus.

11. A telephoto zoom lens according to claim 7, wherein the negative lens component on the image side in said second group is a cemented lens.

12. A telephoto zoom lens according to claim 11 further comprising the following parameters:

f: 80.0-127.98-196.785   F number: 4.5
B.F.: 45.952-45.952-45.952
telephoto ratio: 1.013

$f_R \begin{cases} f_1 \begin{cases} r_1 & 169.300 & d_1 & 4.00 & n_1 & 1.51680 & v_1 & 64.2 \\ r_2 & -594.270 & d_2 & 0.12 \\ r_3 & 92.560 & d_3 & 1.65 & n_2 & 1.75570 & v_2 & 27.2 \\ r_4 & 51.260 & d_4 & 6.85 & n_3 & 1.61375 & v_3 & 56.3 \\ r_5 & 591.773 & d_5 & 5.313\text{-}29.313\text{-}43.313 \end{cases} \\ f_2 \begin{cases} r_6 & 124.160 & d_6 & 1.33 & n_4 & 1.72000 & v_4 & 52.0 \\ r_7 & 39.930 & d_7 & 5.07 \\ r_8 & -45.100 & d_8 & 1.24 & n_5 & 1.60000 & v_5 & 64.2 \\ r_9 & 41.070 & d_9 & 3.20 & n_6 & 1.76182 & v_6 & 26.5 \\ r_{10} & 290.359 & d_{10} & 38.296\text{-}23.197\text{-}1.532 \end{cases} \\ f_3 \begin{cases} r_{11} & 164.560 & d_{11} & 4.50 & n_7 & 1.62041 & v_7 & 60.3 \\ r_{12} & -26.000 & d_{12} & 1.25 & n_8 & 1.62004 & v_8 & 3.63 \\ r_{13} & -116.319 & d_{13} & 11.078\text{-}2.177\text{-}9.780 \end{cases} \\ f_4 \begin{cases} r_{14} & 43.000 & d_{14} & 5.3 & n_9 & 1.56384 & v_9 & 60.8 \\ r_{15} & 942.715 & d_{15} & 1.0 \\ r_{16} & -153.439 & d_{16} & 2.0 & n_{10} & 1.74950 & v_{10} & 35.0 \\ r_{17} & -587.550 & d_{17} & 57.80 \end{cases} \\ f_6 \begin{cases} r_{18} & -24.100 & d_{18} & 2.4 & n_{11} & 1.71300 & v_{11} & 53.9 \\ r_{19} & -40.069 & d_{19} & 0.2 \\ r_{20} & 75.813 & d_{20} & 4.0 & n_{12} & 1.51823 & v_{12} & 59.0 \\ r_{21} & -151.000 \end{cases} \end{cases}$ focal lengths of constituent groups:
 1st group—$f_1$: 120.192
 2nd group—$f_2$: −40.158
 3rd group—$f_3$: 110.664
 relay system front group—$f_4$: 109.576
 relay system rear group—$f_5$: −3313.715
 relay system combined—$f_R$: 117.244 wherein $r_1, r_2, r_3, \ldots$ are the radii of curvature of the refracting surfaces of the lenses in the order from the object side; $d_1, d_2, d_3, \ldots$ the axial thicknesses and air spaces of the lenses; $n_1, n_2, \ldots$ and $v_1, v_2, \ldots$ respectively the refractive indexes to spectrum line d and Abbe number of the lenses; f the composite focal length of the entire system; and B.f. the back focus.

13. A telephoto zoom lens according to claim 6, wherein the positive lens component on the object side in said first group is a cemented lens.

14. A telephoto zoom lens according to claim 13, wherein the negative lens component on the object side in said second group is a cemented lens.

15. A telephoto zoom lens according to claim 14 further comprising the following parameters:

f: 80.0-126.49-200.0 F number 4.5
B.f.: 43.453-43,453-43,453
telephoto ratio: 0.977

$f_R \begin{cases} f_1 \begin{cases} r_1 & 104.890 & d_1 & 1.65 & n_1 & 1.7552 & v_1 & 27.5 \\ r_2 & 59.030 & d_2 & 6.85 & n_2 & 1.61375 & v_2 & 56.3 \\ r_3 & -1109.130 & d_3 & 0.12 \\ r_4 & 144.500 & d_4 & 4.0 & n_3 & 1.5168 & v_3 & 64.2 \\ r_5 & 1017.259 & d_5 & 4.621\text{-}29.605\text{-}45.406 \end{cases} \\ f_2 \begin{cases} r_6 & -280.000 & d_6 & 3.4 & n_4 & 1.7552 & v_4 & 27.5 \\ r_7 & -39.060 & d_7 & 0.9 & n_5 & 1.5168 & v_5 & 64.2 \\ r_8 & 52.030 & d_8 & 4.1 \\ r_9 & -39.500 & d_9 & 1.1 & n_6 & 1.58913 & v_6 & 61.2 \\ r_{10} & 126.630 & d_{10} & 32.186\text{-}20.238\text{-}1.346 \end{cases} \\ f_3 \begin{cases} r_{11} & 171.444 & d_{11} & 4.15 & n_7 & 1.62041 & v_7 & 60.3 \\ r_{12} & -32.52 & d_{12} & 0.9 & n_8 & 1.7552 & v_8 & 27.5 \\ r_{13} & -67.311 & d_{13} & 16.079\text{-}3.043\text{-}6.134 \end{cases} \\ f_4 \begin{cases} r_{14} & 38.040 & d_{14} & 5.3 & n_9 & 1.5168 & v_9 & 64.2 \\ r_{15} & 795.392 & d_{15} & 1.0 \\ r_{16} & -165.900 & d_{16} & 2.0 & n_{10} & 1.7495 & v_{10} & 35.0 \\ r_{17} & -1158.259 & d_{17} & 55.8 \end{cases} \\ f_5 \begin{cases} r_{18} & -23.200 & d_{18} & 2.4 & n_{11} & 1.713 & v_{11} & 53.9 \\ r_{19} & -37.916 & d_{19} & 0.2 \\ r_{20} & 67.838 & d_{20} & 5.3 & n_{12} & 1.61823 & v_{12} & 59.0 \\ r_{21} & -166.027 \end{cases} \end{cases}$ focal length of constituent groups:
 1st group—$f_1$: 121.605
 2nd group—$f_2$: −37.384
 3rd group—$f_3$: 94.067
 relay system front group—$f_4$: 107.255
 relay system rear group—$f_5$: 6110.540
 relay system combined—$f_R$: 112.523 wherein $r_1, r_2, r_3, \ldots$ are the radii of curvature of the refracting surfaces of the lenses in the order from the object side; $d_1, d_2, d_3, \ldots$ the axial thicknesses and air spaces of the lenses; $n_1, n_2, \ldots$ and $v_1, v_2, \ldots$ respectively the refractive indexes to spectrum line d and Abbe number of the lenses; f the composite focal length of the entire system; and B.f. the back focus.

16. A telephoto zoom lens according to claim 13, wherein the negative lens component on the image side in said second group is a cemented lens.

17. A telephoto zoom lens according to claim 16 further comprising the following parameters:

| | | f: 80.0–127.98–196.785 F number: 4.5 |
|---|---|---|
| | | B.f.: 45.881–45.881–45.881 |
| | | telephoto ratio: 1.017 |

| | | | | | | | | | |
|---|---|---|---|---|---|---|---|---|---|
| | | r$_1$ | 104.890 | d$_1$ | 1.65 | n$_1$ | 1.75570 | v$_1$ | 27.2 |
| | | r$_2$ | 56.030 | d$_2$ | 6.85 | n$_2$ | 1.61375 | v$_2$ | 56.3 |
| | f$_1$ | r$_3$ | −1109.130 | d$_3$ | 0.12 | | | | |
| | | r$_4$ | 128.230 | d$_4$ | 4.00 | n$_3$ | 1.51680 | v$_3$ | 64.2 |
| | | r$_5$ | 657.620 | d$_5$ | 6.317–30.317–44.317 | | | | |
| | | r$_6$ | 123.190 | d$_6$ | 1.33 | n$_4$ | 1.72000 | v$_4$ | 52.0 |
| | | r$_7$ | 39.110 | d$_7$ | 5.38 | | | | |
| | f$_2$ | r$_8$ | −44.050 | d$_8$ | 1.24 | n$_5$ | 1.60000 | v$_5$ | 64.2 |
| | | r$_9$ | 41.860 | d$_9$ | 3.20 | n$_6$ | 1.76182 | v$_6$ | 26.5 |
| | | r$_{10}$ | 401.440 | d$_{10}$ | 37.867–22.768–1.103 | | | | |
| | | r$_{11}$ | 180.000 | d$_{11}$ | 4.5 | n$_7$ | 1.62041 | v$_7$ | 60.3 |
| | f$_3$ | r$_{12}$ | −51.240 | d$_{12}$ | 1.25 | n$_8$ | 1.62004 | v$_8$ | 36.3 |
| | | r$_{13}$ | −109.709 | d$_{13}$ | 11.205–2.304–9.997 | | | | |
| | | r$_{14}$ | 43.000 | d$_{14}$ | 5.3 | n$_9$ | 1.56384 | v$_9$ | 60.8 |
| | f$_4$ | r$_{15}$ | 942.715 | d$_{15}$ | 1.0 | | | | |
| f$_R$ | | r$_{16}$ | −153.439 | d$_{16}$ | 2.0 | n$_{10}$ | 1.74950 | v$_{10}$ | 35.0 |
| | | r$_{17}$ | −587.550 | d$_{17}$ | 57.80 | | | | |
| | | r$_{18}$ | −24.400 | d$_{18}$ | 2.4 | n$_{11}$ | 1.71300 | v$_{11}$ | 53.9 |
| | f$_5$ | r$_{19}$ | −40.069 | d$_{19}$ | 0.2 | | | | |
| | | r$_{20}$ | 75.813 | d$_{20}$ | 4.0 | n$_{12}$ | 1.51823 | v$_{12}$ | 59.0 |
| | | r$_{21}$ | −168.690 | | | | | | | focal lengths of constituent groups
 1st group—f$_1$: 120.192
 2nd group—f$_2$: −40.158
 3rd group—f$_3$: 110.664
 relay system front group—f$_4$: 109.576
 relay system rear group—f$_5$: −2984.698
 relay system combined—f$_R$: 117.244 wherein r$_1$, r$_2$, r$_3$, . . . are the radii of curvature of the refracting surfaces of the lenses in the order from the object side; d$_1$, d$_2$, d$_3$, . . . the axial thicknesses and air spaces of the lenses; n$_1$, n$_2$, . . . and v$_1$, v$_2$, . . . respectively the refractive indexes to spectrum line d and Abbe number of the lenses; f the composite focal length of the entire system; and B.f. the back focus.

18. A telephoto zoom lens according to claim 16, wherein said third group further comprises an additional positive lens component.

19. A telephoto zoom lens according to claim 18 further comprising the following parameters:

| | | f: 80.0–126.50–200.0 F number: 4.5 |
|---|---|---|
| | | B.f.: 54.181–54.181–54.181 |
| | | telephoto ratio: 0.996 |

| | | | | | | | | | |
|---|---|---|---|---|---|---|---|---|---|
| | | r$_1$ | 164.587 | d$_1$ | 1.8 | n$_1$ | 1.80518 | v$_1$ | 25.5 |
| | | r$_2$ | 78.777 | d$_2$ | 5.0 | n$_2$ | 1.52 | v$_2$ | 70.1 |
| | f$_1$ | r$_3$ | −495.132 | d$_3$ | 0.1 | | | | |
| | | r$_4$ | 80.5 | d$_4$ | 4.5 | n$_3$ | 1.51118 | v$_3$ | 50.9 |
| | | r$_5$ | ∞ | d$_5$ | 1.367–28.089–44.989 | | | | |
| | | r$_6$ | −3000.000 | d$_6$ | 1.3 | n$_4$ | 1.713 | v$_4$ | 53.9 |
| | | r$_7$ | 39.377 | d$_7$ | 5.7 | | | | |
| | f$_2$ | r$_8$ | −46.793 | d$_8$ | 1.1 | n$_5$ | 1.58913 | v$_5$ | 61.2 |
| | | r$_9$ | 47.803 | d$_9$ | 3.7 | n$_6$ | 1.80518 | v$_6$ | 25.5 |
| | | r$_{10}$ | 858.884 | d$_{10}$ | 27.304–17.304–1.492 | | | | |
| | | r$_{11}$ | −137.843 | d$_{11}$ | 3.0 | n$_7$ | 1.50137 | v$_7$ | 56.5 |
| | | r$_{12}$ | −78.921 | d$_{12}$ | 0.1 | | | | |
| | f$_3$ | r$_{13}$ | 103.905 | d$_{13}$ | 6.6 | n$_8$ | 1.52 | v$_8$ | 70.1 |
| | | r$_{14}$ | −51.174 | d$_{14}$ | 1.3 | n$_9$ | 1.75692 | v$_9$ | 31.7 |
| | | r$_{15}$ | −95.355 | d$_{15}$ | 20.568–3.846–2.758 | | | | |
| | | r$_{16}$ | 32.050 | d$_{16}$ | 7.73 | n$_{10}$ | 1.6583 | v$_{10}$ | 57.3 |
| | f$_4$ | r$_{17}$ | −6557.936 | d$_{17}$ | 5.15 | | | | |
| f$_R$ | | r$_{18}$ | −151.186 | d$_{18}$ | 2.9 | n$_{11}$ | 1.74077 | v$_{11}$ | 27.7 |
| | | r$_{19}$ | 77.279 | d$_{19}$ | 37.35 | | | | |
| | | r$_{20}$ | −17.620 | d$_{20}$ | 1.45 | n$_{12}$ | 1.76684 | v$_{12}$ | 46.6 |
| | f$_5$ | r$_{21}$ | −32.000 | d$_{21}$ | 0.8 | | | | |
| | | r$_{22}$ | 500.000 | d$_{22}$ | 6.28 | n$_{13}$ | 1.54072 | v$_{13}$ | 47.2 |
| | | r$_{23}$ | −37.738 | | | | | | | focal lengths of constituent groups:
 1st group—f$_1$: 116.052
 2nd group—f$_2$: −35.371
 3rd group—f$_3$: 90.899
 relay system front group—f$_4$: 107.088
 relay system rear group—f$_5$: −673.394
 relay system combined—f$_R$: 128.798 wherein r$_1$, r$_2$, r$_3$, . . . are the radii of curvature of the refracting surfaces of the lenses in the order from the object side; d$_1$, d$_2$, d$_3$, . . . the axial thicknesses and air spaces of the lenses; n$_1$, n$_2$, . . . and v$_1$, v$_2$, . . . respectively the refractive indexes to spectrum line d and Abbe number of the lenses; f the composite focal length of the entire system; and B.f. the back focus.

* * * * *

UNITED STATES PATENT AND TRADEMARK OFFICE
CERTIFICATE OF CORRECTION

PATENT NO. : 4,223,981
DATED : September 23, 1980
INVENTOR(S) : NORIO MIZUTAMI AND YOSHINORI HAMANISHI It is certified that error appears in the above-identified patent and that said Letters Patent are hereby corrected as shown below:

Column 2, line 54, equation (2), change

"$0.05 < n_a - n_b < 0.45$" to -- $0.05 < n_b - n_a < 0.45$ --.

Column 9, line 52, Claim 5, change

"$0.05 < n_a - n_b < 0.45$" to -- $0.05 < n_b - n_a < 0.45$ --.

Signed and Sealed this

Twenty-first Day of April 1981

[SEAL]

Attest:

RENE D. TEGTMEYER

Attesting Officer     Acting Commissioner of Patents and Trademarks